US007054416B2

(12) United States Patent
Meyerson et al.

(10) Patent No.: US 7,054,416 B2
(45) Date of Patent: May 30, 2006

(54) MODULAR MULTI-MEDIA COMMUNICATION MANAGEMENT SYSTEM

(76) Inventors: Robert F. Meyerson, 2180 Immokalee Rd., Suite 311, Naples, FL (US) 34110; Calvin E. Lewis, 3760 Fairway Park Dr., Suite 206, Copley, OH (US) 44321

( * ) Notice: Subject to any disclaimer, the term of this patent is extended or adjusted under 35 U.S.C. 154(b) by 410 days.

(21) Appl. No.: 10/000,543

(22) Filed: Oct. 23, 2001

(65) Prior Publication Data

US 2003/0059024 A1    Mar. 27, 2003

Related U.S. Application Data

(63) Continuation-in-part of application No. 09/961,532, filed on Sep. 24, 2001.

(51) Int. Cl.
*H04M 11/00* (2006.01)
(52) U.S. Cl. ............................... 379/88.13; 379/428.04
(58) Field of Classification Search ........ 455/525–561; 370/332–338; 379/88.13–93.17, 88.11, 420.04, 379/428.03, 428.04
See application file for complete search history.

(56) References Cited

U.S. PATENT DOCUMENTS

| 4,817,127 | A |   | 3/1989  | Chamberlin et al. |
|-----------|---|---|---------|-------------------|
| 5,197,092 | A | * | 3/1993  | Bamburak ............ 379/211.05 |
| 5,483,586 | A |   | 1/1996  | Sussman |
| 5,550,907 | A |   | 8/1996  | Carlsen |
| 5,655,015 | A |   | 8/1997  | Walsh et al. |
| 5,671,269 | A | * | 9/1997  | Egan et al. ................ 379/67.1 |
| D389,146  | S |   | 1/1998  | Tan |
| 5,742,905 | A |   | 4/1998  | Pepe et al. |
| 5,799,068 | A |   | 8/1998  | Kikinis et al. |
| 5,822,404 | A | * | 10/1998 | Cave ........................ 379/88.13 |
| 5,870,549 | A |   | 2/1999  | Bobo, II |
| 5,916,302 | A |   | 6/1999  | Dunn et al. |
| 5,917,543 | A |   | 6/1999  | Uehara |
| 5,979,757 | A | * | 11/1999 | Tracy et al. ................ 235/383 |
| 5,983,073 | A |   | 11/1999 | Ditzik |
| 6,002,918 | A | * | 12/1999 | Heiman et al. ............ 340/7.38 |
| 6,188,677 | B1 |  | 2/2001  | Oyama et al. |
| 6,240,168 | B1 |  | 5/2001  | Stanford et al. |
| 6,330,244 | B1 |  | 12/2001 | Swartz et al. |
| 6,330,321 | B1 |  | 12/2001 | Detampel, Jr. et al. |
| 6,366,653 | B1 |  | 4/2002  | Yeh et al. |
| 6,366,771 | B1 |  | 4/2002  | Angle et al. |

(Continued)

OTHER PUBLICATIONS

Symbol Technologies, Press Release, Symbol Announces Wireless LAN Telephone System. Jan. 19, 1998.

*Primary Examiner*—Bing Q. Bui
(74) *Attorney, Agent, or Firm*—Timothy P. OHagan

(57) ABSTRACT

The present multi-media communication management system comprises a controller that interfaces with a plurality of space station communication devices and with one or more communication medium service providers. The controller translates multi-media communications received from a multi-media service provider into the protocols required for use by the space station communication devices as well as any convention telephone stations that may be coupled to the controller. The communication and control signaling between the controller and the space station communication devices may be wireless in nature with the space station communication devices being powered by an internal battery and/or connection to a local source of conventional line voltage. Modular docking interfaces may be used to couple the space station communication device to portable subscriber devices and to enable integrated and coordinated communication through multiple communication medium service providers.

14 Claims, 13 Drawing Sheets

U.S. PATENT DOCUMENTS

| | | |
|---|---|---|
| 6,389,005 B1 | 5/2002 | Cruickshank |
| 6,396,907 B1 | 5/2002 | Didcock |
| 6,404,772 B1 | 6/2002 | Beach et al. |
| 6,424,711 B1 | 7/2002 | Bayless et al. |
| 6,429,855 B1 | 8/2002 | Pabon et al. |
| 6,539,499 B1 | 3/2003 | Stedman et al. |
| 6,577,609 B1 * | 6/2003 | Sharony .................... 370/312 |
| 6,600,734 B1 * | 7/2003 | Gernert et al. .............. 370/352 |
| 6,792,295 B1 * | 9/2004 | Hanevich et al. ........ 455/569.1 |
| 6,813,505 B1 * | 11/2004 | Walley et al. .............. 455/464 |
| 2002/0085535 A1 | 7/2002 | Williams |
| 2002/0086702 A1 | 7/2002 | Lai et al. |
| 2003/0058805 A1 * | 3/2003 | Meyerson et al. .......... 370/260 |
| 2003/0058858 A1 * | 3/2003 | Berlyoung et al. ......... 370/390 |
| 2003/0059020 A1 * | 3/2003 | Meyerson et al. .......... 379/219 |

\* cited by examiner

| | Start Up State - Waiting for Events | |
|---|---|---|
| | Events | Steps |
| 300 | Open Session Request on Predetermined Port | · Establish New Local Communication Device State Machine<br>· Establish Session<br>· Send Logon Control Scripts<br>· Get CSS Interface Configuration<br>· Provide Main Menu Display Content<br>· Provide Main Menu Layout Control<br>· Go to Main Menu State |

Figure 10a

| | Main Menu State - Waiting for Events | |
|---|---|---|
| | Events | Steps |
| 302 | Menu Selection | · Go To Selected State |
| 304 | Voice Session Signal to CSS | · Complete Audio Session Signaling<br>· Set Up Audio Session Channels<br>· Go To Audio Session State |
| 306 | Voice Session Signal from CSS | |
| 308 | Initialize Subscriber Device | · Send ID Extraction Control Scripts<br>· Get Subscriber Device ID<br>· Provide Initial Display Content<br>· Provide Display Layout Control<br>· Go To Subscriber Device Main Menu State |
| 310 | Help Request | · Set Up Audio Session Channel<br>· To Audio Help CCS<br>· Go To Audio Help State |

Figure 10b

| Subscriber Device Main Menu State - Waiting for Events ||
|---|---|
| Events | Steps |
| 312 — Menu Selection | • Go To Selected State |
| 314 — Voice Session Signal to CSS | • Complete Audio Session Signaling |
| 316 — Voice Session Signal to SD | • Set Up Audio Session Channels<br>• Go To Audio Session State |
| 318 — Voice Session Signal from CSS | |
| 320 — Help Request | • Provide Help Menu Display Content<br>• Provide Help Menu Display Layout Control<br>• Go To Graphic Help State |
| 322 — Message Request | • Get Messages from Remote System<br>• Sort Messages by Type<br>• Provide Message List Content<br>• Provide Message List Layout Control<br>• Go To Message List State |
| 324 — Audio Message Request | |
| 326 — Subscriber Device Remove | • Go To Main Menu State |

Figure 10c

| Message List State - Waiting for Events | |
|---|---|
| Events | Steps |
| 328 — Voice Session Signal to CSS | • Set Up Audio Session Channels |
| 330 — Voice Session Signal to SD | • Go To Audio Session State |
| 332 — Voice Session Signal from CSS | |
| 334 — Audio Message Select | • Set Up Audio Session Channel to CSS<br>• Start Audio Content Messages<br>• Go To Audio Session State |
| 336 — Message Select | • Provide Message Display Content<br>• Provide Message Display Layout Control<br>• Go To Message Display State |
| 338 — Message Print | • Format Message Content for Printer<br>• Send Message File to Printer<br>• Go To Message List State |
| 340 — Help Request | • Provide Help Menu Display Content<br>• Provide Help Menu Display Layout Control<br>• Go To Graphic Help State |
| 342 — Subscriber Device Remove | • Go To Main Menu State |

Figure 10d

| 344 | Base State - Waiting for Events ||
|---|---|---|
| | Events | Steps |
| 350 | Audio Session Signal from Controller | • Set Up Audio Session Channels<br>• Go To Audio Session State |
| 352 | Audio Session Initiation by Subscriber | |
| 354 | Audio Session Initiation by SD | |
| 356 | Subscriber Interface Control | • Replay Control Activation to Control Unit<br>• Go To Base State |
| 358 | Receive Display Content and Receive Display Layout Control | • Update Display<br>• Go To Base State |
| 360 | Receive Processing Script | • Process Script<br>• Go To Base State |
| 362 | WAN Telephone Signal | • Go To WAN State |
| 364 | Detect Subscriber Device | • Send Initialize Subscriber Message<br>• Go To Base State |

| 346 | Base State - Waiting for Events ||
|---|---|---|
| | Events | Steps |
| 366 | Network Connection | • Session Request to Control Unit |
| 368 | Receive Logon Script | • Process Logon Script<br>• Provide Interface Configuration<br>• Go To Base State |

Figure 11

MODULAR MULTI-MEDIA COMMUNICATION MANAGEMENT SYSTEM

CROSS REFERENCE TO RELATED APPLICATIONS

The present application is a continuation in part of U.S. patent application Ser. No. 09/961,532 titled "Teledata Space and Docking Station with Modular and Integrated Display", filed on Sep. 24, 2001, the contents of such patent application is incorporated herein.

TECHNICAL FIELD

The present invention relates generally to managing multi-media communications, and more particularly to a modular system for integrating and coordinating a subscriber's communication needs.

BACKGROUND OF THE INVENTION

In today's fast paced business world, it is common for a person to rely on a combination of communication devices, such as: desk top telephones, mobile telephones, cellular telephones, fax machines, pagers, and the like, as well as enhanced communication services, such as: voice mail, e-mail, text messaging and the like to accommodate their communication needs.

In an office environment, desk top telephone service, voice mail service, and fax service is typically provided by a private telephone communication system. A contemporary private telephone communication system consists of a switching network, a plurality of desktop telephones, and a voice mail server. The voice mail server is typically coupled to the switching network using a proprietary interface. Each desk top telephone and fax machine is coupled to the switching network by an extension line that consists of twisted pair conductors that are terminated by a telephone jack in the office. Communication between the desktop telephone and the switching network over each extension line utilizes either proprietary digital signaling or plain old telephone service (POTS) signaling. The switching network is further coupled to the public switched telephone network (PSTN) using trunk lines that are connected to a central office switch that is typically managed by the local telephone service provider. The switching network controls calls between extensions and between an extension and a remote destination via a trunk line coupled to the PSTN. The switching network also routes calls to the voice mail server when an extension remains unanswered, is busy, or is otherwise programmed to route calls to voice mail.

Recently fixed wireless networks have enabled wireless mobile telephones to be supported by the private telephone communication system. A wireless telephone controller is coupled to a wireless network in which a plurality of mobile telephones may be operated. The wireless telephone controller is coupled to the switching network of the private telephone communication system. In operation, each mobile telephone is assigned an extension number and calls directed to that extension are routed to the wireless telephone controller and then to the mobile telephone over the wireless network. Because the mobile telephone is equivalent to a desktop telephone from the perspective of the private telephone communication system, full voice mail services are supported for the mobile telephone.

E-mail service is typically provided by an e-mail service provider (either a private system or an independent Internet mail service provider). An e-mail client on the person's desktop and/or notebook computer is typically used for sending and receiving e-mail over a data network connection to the e-mail service provider.

Cellular service is provided by a cellular service provider. A cellular handset is used to place and receive cellular telephone calls within the cellular service provider's network. Additionally, the cellular service provider may offer a voice mail service which prompts callers to leave a voice mail in the event that the cellular handset is busy or remains unanswered after several rings. Similarly, pager services are provided by a paging service provider. A one-way (or two-way) pager may receive (and send) text messages within the paging service provider network.

A problem associated with the above systems is that there is a lack of integration and coordination between the services. This lack of integration and coordination causes a person to carry several devices with them as they do not know which telephone number a caller will choose to use. And, it causes a person to check multiple voice mail systems and e-mail systems frequently to avoid delays in returning calls or e-mails.

Some of these problems can be eliminated, in theory, by vigilant use of call forwarding services to assure that incoming calls are forwarded, or funneled, to a single telephone that the person chooses to use at a particular time. However, call forwarding is unworkable if call forward programming cannot be changed remotely and is still time consuming if programming can be performed remotely.

Other advancements in voice mail server technology have addressed the need to frequently check multiple voice mail systems. For example, some voice mail servers send an audio file of a voice mail message to a specified e-mail address. This enables a person to retrieve voice mail messages through his or her e-mail client rather than dialing into the voice mail server. Additionally, some voice mail servers also initiate a call to a person's pager after a voice mail has been received to notify the person of a voice mail has arrived.

While these advances have helped address the problems, they have not eliminated the need to have all such communication devices and the need to vigilantly check multiple systems for voice mail and/or e-mail messages throughout the day.

What is needed is a multi-media communication management system that allows for operator mobility that does not suffer the lack of integration and coordination of existing communication systems.

SUMMARY OF THE INVENTION

The present multi-media communication management system comprises a controller that interfaces with a plurality of space station communication devices and with one or more communication medium service providers. The controller translates multi-media communications received from a multi-media service provider into the protocols required for use by the space station communication devices as well as any convention telephone stations that may be coupled to the controller. The communication and control signaling between the controller and the space station communication devices may be wireless in nature with the space station communication devices being powered by an internal battery and/or connection to a local source of conventional line voltage.

The architecture of the space station communication device is modular. Multiple functional elements can be interconnected with backbone communication circuitry to form an integrated communication platform. Modular docking interfaces may be used to couple the space station communication device to portable subscriber devices and to enable integrated and coordinated communication through multiple communication medium service providers. This coordinated and integrated system architecture enables the space station communication device to merge the functionality and internal data of the various portable subscriber devices into the space station communication device, to direct the functionality and data of the space station communication device to a selected one of the portable subscriber devices, and to provide the subscriber with a simple subscriber interface.

For a better understanding of the present invention, together with other and further aspects thereof, reference is made to the following description, taken in conjunction with the accompanying drawings, and its scope will be pointed out in the appended clams.

BRIEF DESCRIPTION OF THE DRAWINGS

FIG. 10a is a table diagram representing an exemplary state of operation of a communication management system in accordance with one embodiment of the present invention;

FIG. 10b is a table diagram representing an exemplary state of operation of a communication management system in accordance with one embodiment of the present invention;

FIG. 10c is a table diagram representing an exemplary state of operation of a communication management system in accordance with one embodiment of the present invention;

FIG. 10d is a table diagram representing an exemplary state of operation of a communication management system in accordance with one embodiment of the present invention; and FIG. 11 is table diagram representing exemplary states of operation of a modular communication space station accordance with one embodiment of the present invention.

DESCRIPTION OF THE PREFERRED EMBODIMENTS

Figure 1:
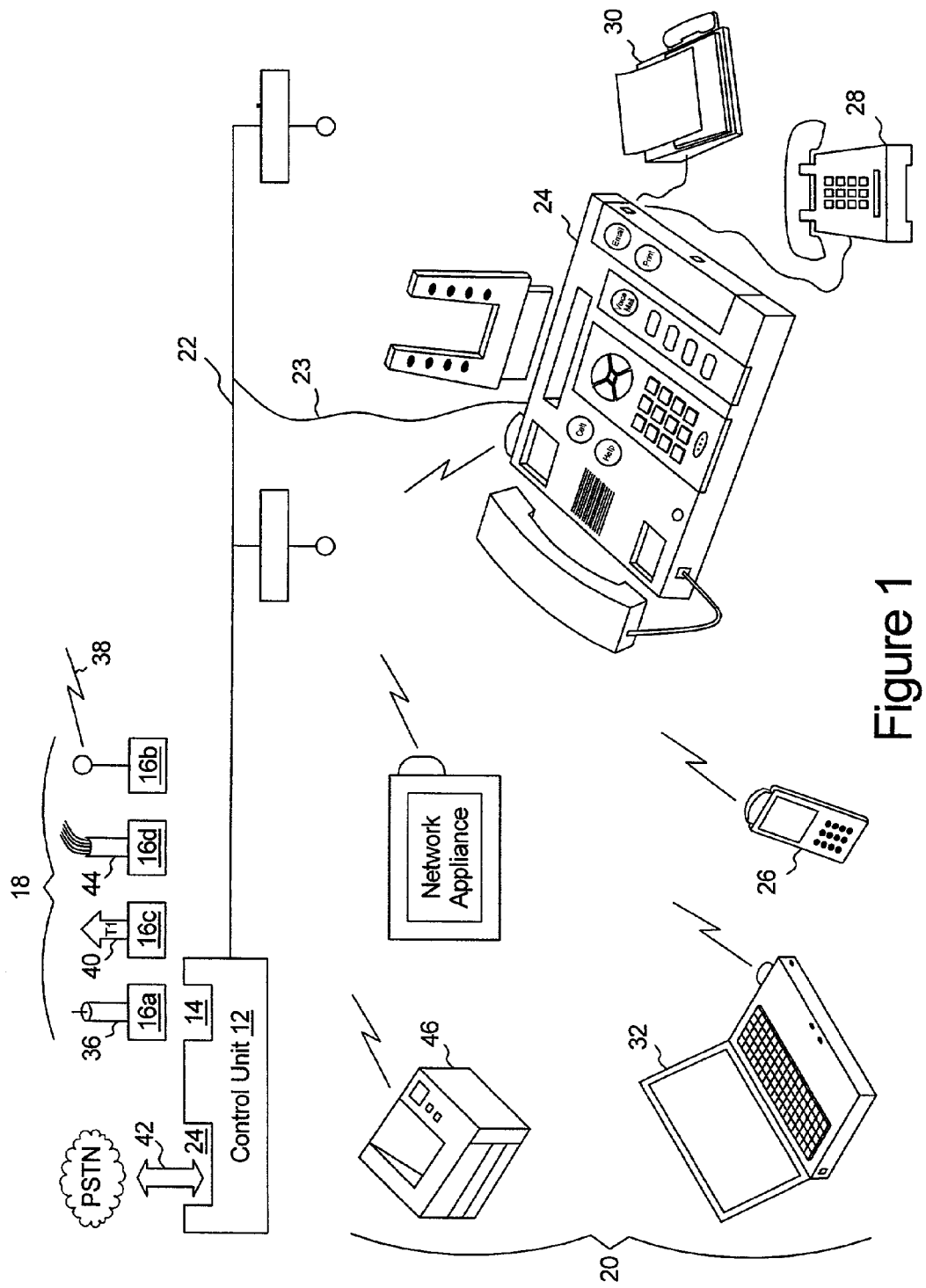
FIG. 1 is a block diagram view of a modular multi-media communication management system in accordance with one embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

Referring to FIG. 1, an exemplary architecture of the multi-media communication management system 10 of the present invention is shown. The multi-media communication management system 10 includes a control unit 12 that is coupled with a plurality of local communication devices 20 over a wireless local area network 22 (or by a wired network connection 23 to the backbone wired network of the wireless local area network 22). The local communication devices 20 may include: subscriber stations 24 (communication space stations 24), wireless voice handsets 26, traditional telephone handsets 28 & traditional fax machines 30 (both coupled through communication space station 24), traditional computer systems 32, network printers 46, and various network appliances 34.

In operation, the control unit 12 integrates and manages multi-media communication between the local communication devices 20 and between each local communication device 20 and a remote service provider (not shown) over the service provider's multi-media communication medium 18. More specifically, the control unit 12 translates received multi-media communication signals from the multi-media communication medium 18 (or a source local device 20) to the protocols required for use by the destination local communication device 20 (or the multi-media communication medium 18).

The control unit 12 includes a multi-media communication service provider bay 14 that operatively couples one of a plurality of communication medium modules 16a14 16d to the control unit 12. Each communication medium module 16a14 16d is configured to interface with a service provider's multi-media communication medium 18a14 18d. For purposes of illustration, communication module 16(a) may be a cable modem module for communicating over coaxial cable 36 with a multimedia communication service provider such as a local cable company, communication module 16(b) may be a wide area network radio for communication over a wireless spectrum channel 38 with a wide area wireless multi-media communication service provider such as an analog or digital cellular/PCS telephone service provider, communication module 16c may be a customer service unit (CSU) for communication over a T1 line 40 with a multi-media communication provider such as a local telephone service provider, and communication module 16d may be an optical modem for communication over a fiber channel 44 with a fiber optic multimedia communication service provider. It should be appreciated that the examples of communication modules 16a14 16d are for illustrative purposes only and it is recognized that multi-media communication services may be provided by other service providers utilizing other communication technologies such as satellite RF or other. For purposes of this invention, a communication module 16 includes circuitry for interfacing between the control unit 12 and a selected multi-media communication service provider. The control unit 12 further comprises a circuit switched provider bay 24 which operatively couples one or more public switched telephone network (PSTN) channels 42.

Communication Space Station

Figure 2:
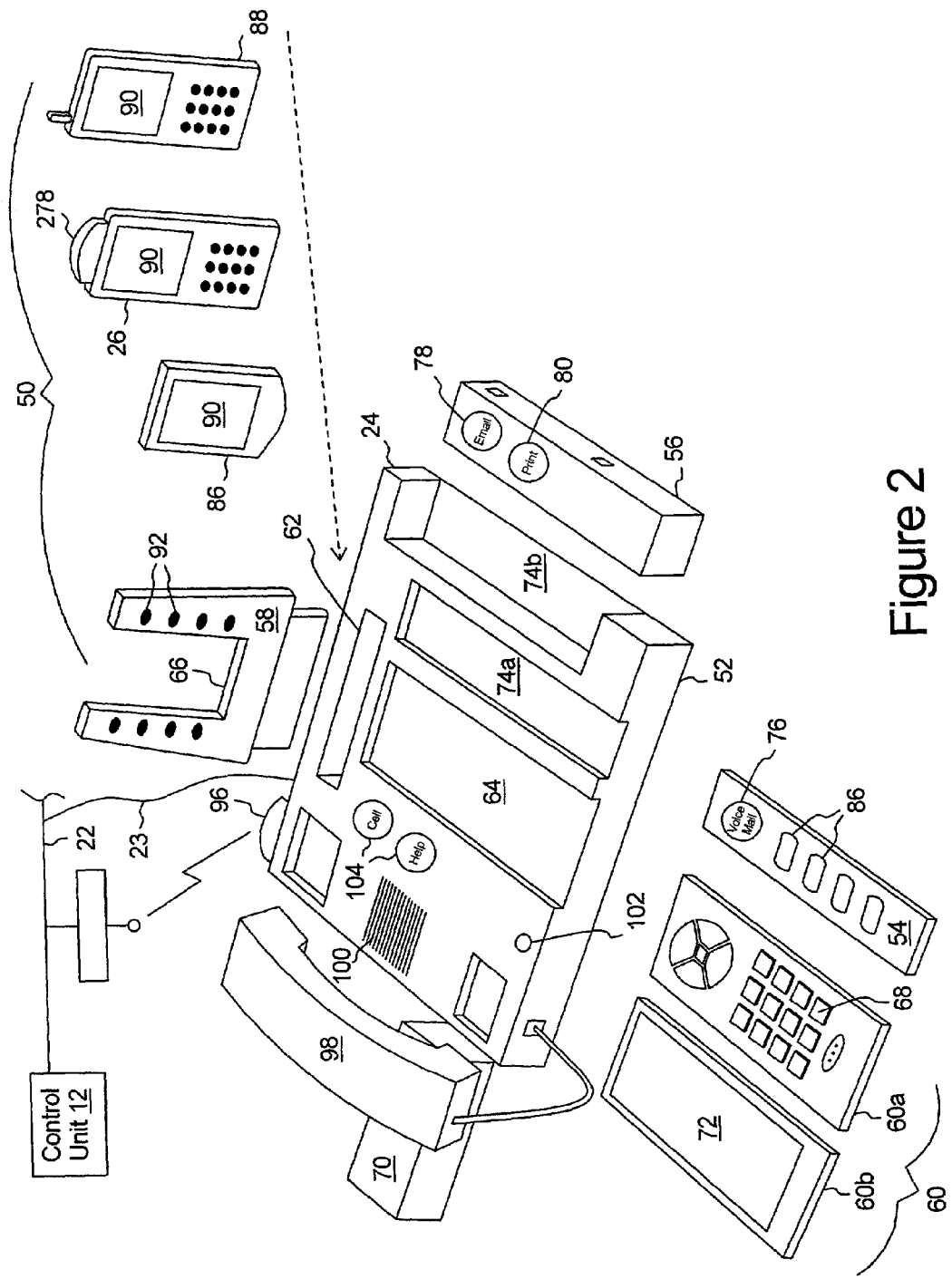
FIG. 2 is a perspective exploded view of a modular communication space station in accordance with one embodiment of the present invention.

Referring to FIG. 2, a perspective view of an exemplary communication space station 24 is shown. The communication space station 24 includes a platform unit 52 that operatively couples to the control unit 12 via either a wireless communication link between a platform unit network circuit 96 and the wireless network 22 or a direct network connection 23 between the platform unit 52 and the backbone network of the wireless network 22.

A plurality of functional modules 54, 56, 58, and 60 may be coupled to the platform unit 52 to form an integrated multi-media communication platform. The platform unit 52 includes a subscriber interface docking platform 64 for coupling and optionally supporting one of a plurality of modular subscriber interface units 60 to the platform unit 52. The modular subscriber interface unit 60a may include a plurality of buttons 68 in an arrangement similar to a typical telephone key pad to provide for subscriber input in a manner similar to that of a traditional telephone handset. The modular subscriber interface 60b may include a liquid crystal touch panel display 72 to provide for subscriber input through virtual buttons visible thereon.

The platform unit 52 further includes a first function specific docking platform 74a and a second function specific docking platform 74b, each of which couples to a plurality of function specific modules 54 and 56. The first function specific docking platform 74a is a shallow platform for coupling to function specific modules that primarily comprise function specific buttons or other circuits that may be placed within a thin module. The second function specific docking platform 74b is a larger platform for coupling to function specific modules with more complex internal circuits required the additional size.

In the exemplary embodiment, the function specific module 54 may include subscriber interface buttons configured for enhancing voice communication through the communication space station 24 such as an audio message control 76 for single button access to audio message files and voice management controls 86 for single button control of enhanced voice management functions.

The function specific module 56 may include circuits configured for enhancing data communication through the communication space station 24 such as an electronic message control 78 for single button access to subscriber electronic messages, a print control 80 for single button initiation of the printing of a subscriber electronic message file, and multiple data networking ports 84.

The platform unit 52 further includes a docking bay 62 into which a modular docking interface 58 may be secured and operatively coupled to the platform unit 52. The modular docking interface 58 supports one of a plurality of modular subscriber devices 50 within a subscriber device interface bay 66 and provides for operatively coupling the modular subscriber device 50 to the platform unit 52. Exemplary configurations for the modular subscriber device 50 include a subscriber data assistant 86, a subscriber wide area network communication device 88, and the wireless LAN voice handset 26, each of which is discussed in more detail herein.

While operatively coupled to the platform unit 52, the subscriber device 50 becomes an integral part of the subscriber interface of the communication space station 24. A liquid crystal display 90 on the subscriber device 50 may function to display multi-media communication management information under control of the platform unit 52 and the control unit 12. Further, programmable subscriber controls 92 positioned adjacent to the subscriber device 50 may be configured to activate platform unit 52 and control unit 12 functions in accordance with the contents of the display 90 adjacent to the controls 92.

The platform unit 52 may further include one or more of the following elements: a) a handset 98 similar to a traditional telephone handset to provide a subscriber voice interface, b) a speaker 100 and a microphone 102 to provide a hands-free subscriber voice interface, c) a modular battery pack 70 (which fits within a battery pack bay that is not shown) for operating power when the communication space station 24 is uncoupled from a line voltage, and d) platform buttons 104 for single button selection of certain functions such as a help function and a wide area network communication function.

Figure 3:
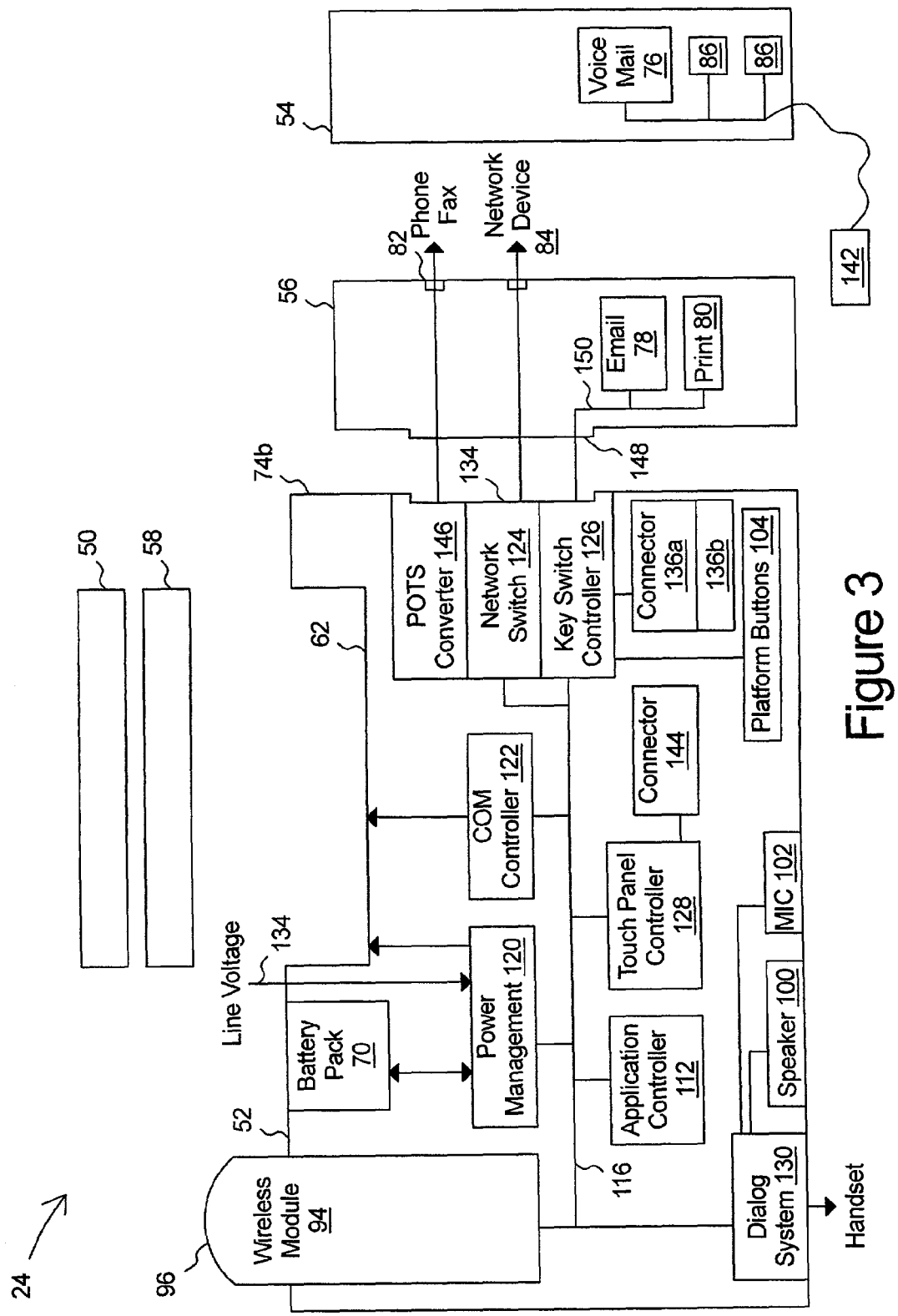
FIG. 3 is a block diagram of a communication space station in accordance with one embodiment of the present invention.

FIG. 3 shows a block diagram of the communication space station 24. The platform unit 52 includes an application controller 112 coupled to a local bus 116 that interconnects the application controller 112 with a plurality of peripheral circuits that include a wireless module 94, a power management controller 120, a communication controller 122, a network switch controller 124, a key switch controller 126, a touch panel controller 128, a plain old telephone service (POTS) converter 146, and a voice communication system 130.

The wireless module 94 operatively couples the platform unit 52 with the control unit 12 over the wireless LAN 22 (both of FIG. 1). The application controller 112 includes appropriate drivers for operation of the wireless module 96.

The power management controller 120 selectively receives input power from the battery pack 70 or external line voltage 134. The power management controller 120 includes appropriate circuits for converting the input power voltage to appropriate operating power required by each component of the communication space station 24. Additionally, the power management controller 120 includes appropriate circuits for managing charging of the battery pack 70 when the platform unit 52 is coupled to the line voltage 134 and generating appropriate power for operating and/or charging the modular docking interface 58 and the modular subscriber device 50 when coupled to the platform unit 52.

The communication controller 122 operatively couples the modular docking interface 58 and the modular subscriber device 50 to the application controller 112 such that the platform 52 can exchange data with the modular subscriber device 50. In the exemplary embodiment the communication controller is a serial communication controller that enables the serial exchange of data with a compatible serial communication controller within the modular subscriber device 50 over a physical medium. Exemplary physical mediums include hardwired contacts, an infrared transmission, and RF transmission, however other physical mediums are envisioned and the selection of a physical medium is not critical to this invention.

The network switch controller 124 provides a network data port circuit which enables the application controller 112 to communication with another network computing circuit over a network interface. The network switch controller 124 is coupled to a bus port 135 within the function specific docking platform 74b for coupling to a mating port 148 on the function specific module 56.

The key switch (e.g. button) controller 126 is coupled to: 1) a connector 136a which in turn is coupled to a mating connector on the modular subscriber interface unit 60a (FIG. 2) for interconnecting the buttons 68 to the key switch controller 126; 2) a connector 136b which in turn is coupled to a mating connector 142 on the function specific module 54 for interconnecting the buttons 76 and 86 to the key switch controller 126; 3) the bus port 135 which in turn is coupled to a mating port 148 on the function specific module 56 for interconnecting the buttons 78 and 80 to the key switch controller 126; and 4) the platform buttons 104. In the exemplary embodiment, the key switch controller 126 may drive row and column signals to the various buttons and, upon detecting a short between a row and a column (e.g. button activation) reports the button activation to the application controller 112 over the bus 116. Again, the application controller 112 includes appropriate drivers for operating the key switch controller 126.

The touch panel controller 128 is coupled to a connector 144 which in turn is coupled to a mating connector on the modular subscriber interface unit 60b (FIG. 2) for interconnecting the touch panel 72 to the touch panel controller 128. In the exemplary embodiment, the touch panel controller 128 may include a separate display control circuit compatible with the resolution and color depth of the display of touch panel 72 and a separate touch panel control circuit for detecting subscriber contact with the touch panel 72. The application controller 112 includes appropriate systems for driving the contents of the touch panel 72 through the touch panel controller 128.

The audio communication system 130 generates analog audio signals for driving the speaker 100 (or the speaker in the handset 98 of FIG. 2) and detects input form the microphone 102 (or the microphone in the handset 98) under the control the application controller 112.

The POTS converter circuit 146 provides a standard POTS port signal (e.g. tip and ring) for operation of a traditional telephone or a traditional fax machine coupled to a POTS port 82 on the function specific module 56. In operation the POTS converter 146 circuit interfaces between the POTS signal and the application controller 112.

Figure 4:
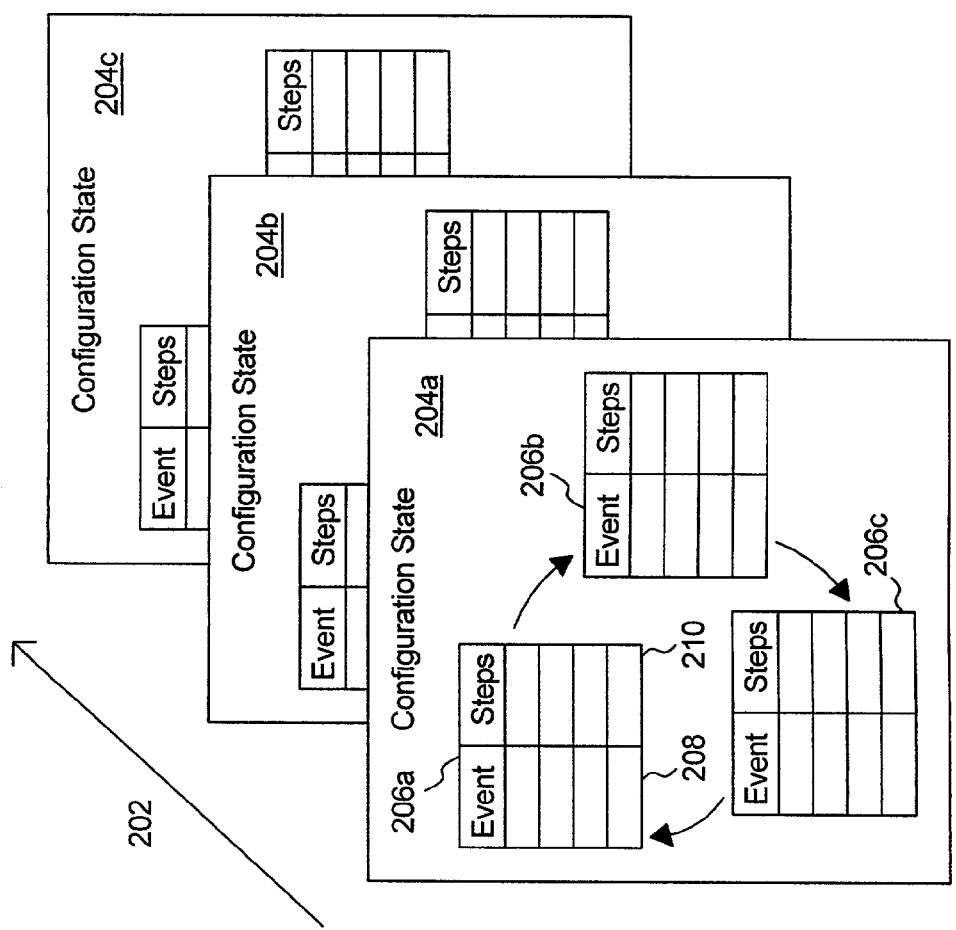
FIG. 4 is a block diagram representing a multi-dimensional event driven state machine in accordance with one embodiment of the present invention.

In the exemplary embodiment, the application controller 112 is a multi-dimensional, event driven state machine. Referring briefly to FIG. 4 in conjunction with FIG. 3, operation of the application controller 112 in conjunction with the peripheral circuits is discussed. Because the platform unit 52 may be configured with various: modular subscriber interface units 60; function specific modules 54 and 56; and modular subscriber devices 50, the multidimensional event driven state machine 200 includes dimension 200 which represents operation of separate configuration event driven state machines 204a, 204b, and 204c for each of a plurality of platform unit 52 configurations.

Within each configuration event driven state machine, 204a, 204b, and 204c, there are multiple processing states. For example, configuration event driven state machine 204a includes processing states 206a, 206b, and 206c. Within each processing state various events 208 that may be generated by one of the peripheral circuits may be detected by the application controller 112 and, upon detecting an event 208, a certain string of processing steps 210 that correspond to the particular event 208 (within the processing state within the configuration state) is performed by the application controller 112. The processing steps may include executing control scripts received form the control unit 12, generating a display on the touch panel 72 or on the display 90 on the subscriber device 50 in accordance with display content messages and display layout control messages received from the control unit 12, relaying audio data between the control unit 12 and the voice system 130, providing messages indicating subscriber activation of platform buttons 104 to the control unit 12, and transitioning to a different processing state and/or transitioning to a different configuration state. A more detailed discussion of exemplary processing states 206, events 208, and corresponding processing steps are discussed later herein.

Control Unit

Figure 5:
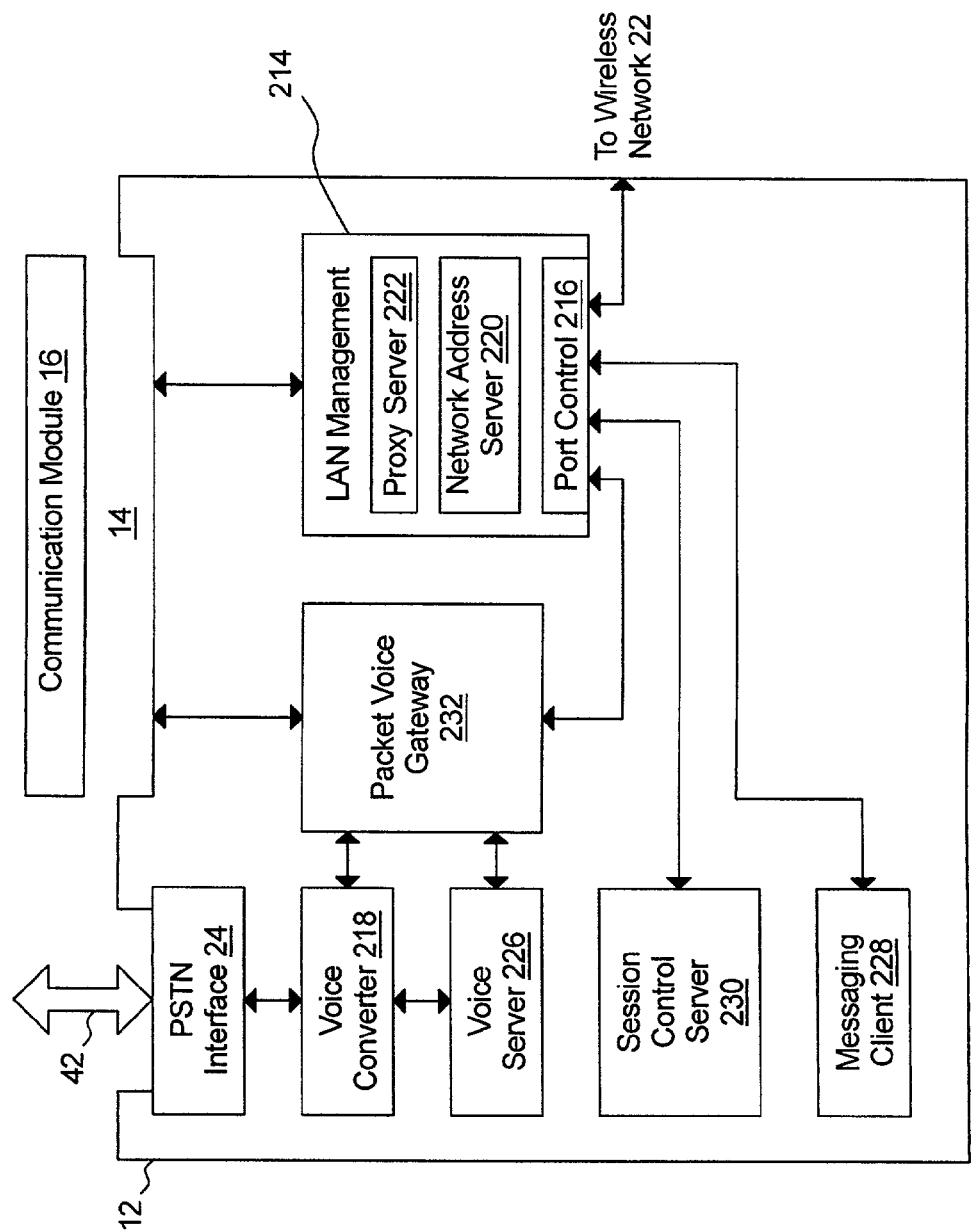
FIG. 5 is a block diagram of a multi-media communication management system controller in accordance with one embodiment of the present invention.

FIG. 5 shows a block diagram of the control unit 12 in accordance with an exemplary embodiment of the present invention. As discussed previously, the control unit 12 includes a multi-media communication service provider bay 14 which operatively couples one of a plurality of communication medium modules 16 to the control unit 12 for providing an interface to a service provider's multi-media communication medium. The control unit 12 further includes a local area network management system 214, a voice converter circuit 218, a voice server 226, a packet voice gateway 232, a session control server 230, and a messaging client 228.

The local area network management system 214 manages the communication of data between the control unit 12 and each of the local communication devices 20 (FIG. 1). The local area network management system 226 may include an address server 220 for assigning a network address (from a block of available network addresses) to each local communication device 20 upon the local communication device subscribing to the wireless network 22 and requesting a network address. The local area network management system 214 may also include a proxy server 222 for communicating with remote devices via the service provider multimedia communication medium 18 on behalf of each of the local communication devices 20.

A port control circuit 216 may interconnect the local area network management system 214 to each of the wireless network 22, the packet voice gateway 232, the session control server 230, and the messaging client 228 over standard network port connections.

The messaging client 228 provides for authenticating a subscriber to a remote messaging server (not shown) coupled to the service provider multi-media communication medium 18 and copying a plurality of subscriber messages from such messaging server. The voice server 226 provides audio prompts for providing a voice interface to accept an audio message for a subscriber, store the message as a digital file, and send the digital file to the remote messaging server associated with the subscriber.

The session control server 230 operates the protocols for sending multimedia content messages and control messages to each local communication device 20 over the wireless local area network 22. In the exemplary embodiment, the communications between the session control server 230 and each local communication device occurs using tagged messages. The tag for each message identifies the content of the message to the recipient local communication device 20.

The packet voice gateway 232 operates provides real time voice communications between local communication devices 20 and between a local communication device 20 and a remote voice communication device over either the multi-media communication service provider medium 14 or the circuit switched channel 42.

The voice converter 218 functions to convert audio signals compatible with the circuit switched channel 42 to packet voice signals compatible with the voice server 226 and the packet voice gateway 232 and, in reverse, functions to convert packet voice signals to audio signals compatible with the circuit switched channel 42.

Figure 6:
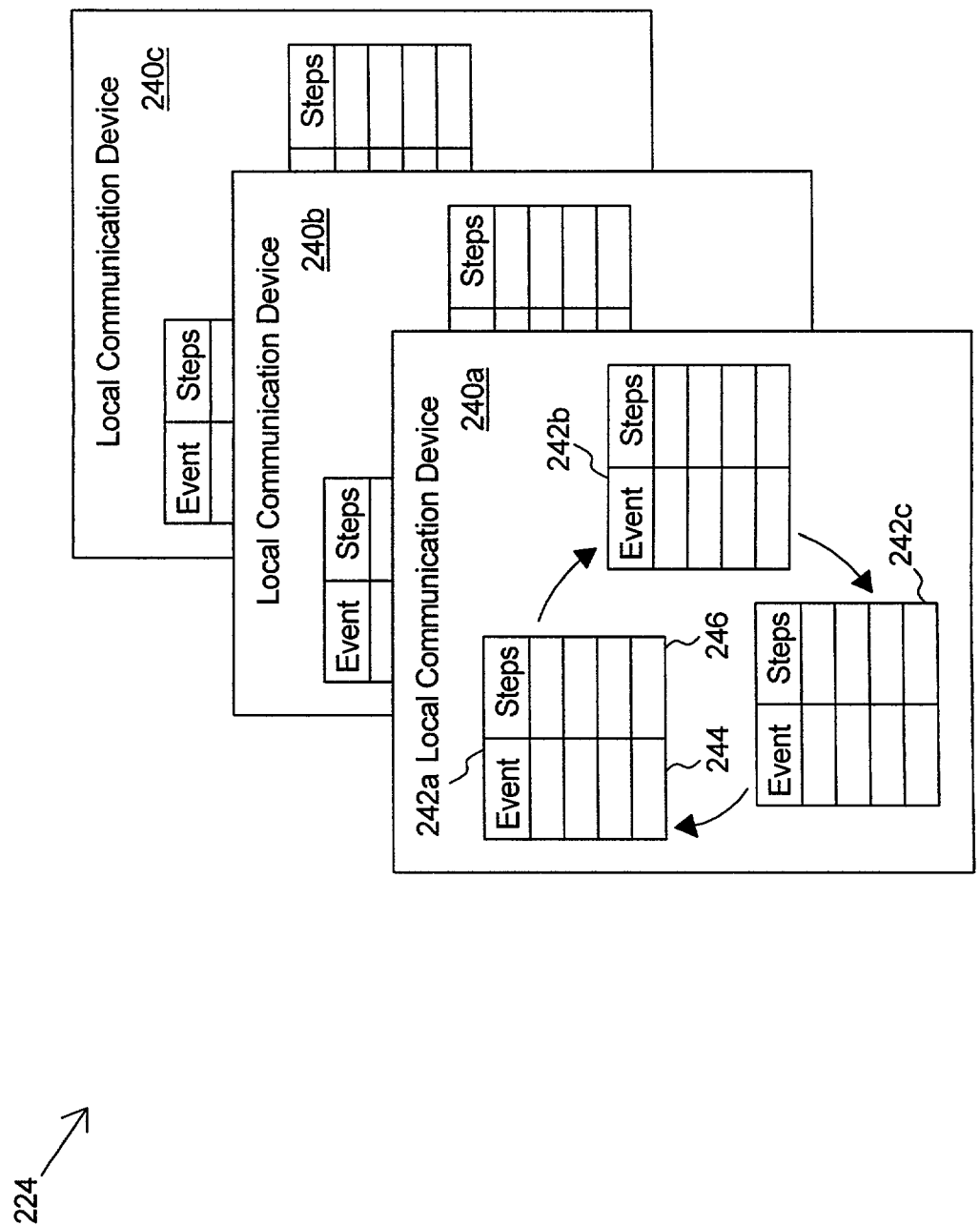
FIG. 6 is a block diagram of a multi-tasking event driven state machine in accordance with one embodiment of the present invention.

Each of the local area network management system 214, the packet voice gateway 232, the voice converter 218, the voice server 226, the session control server 230, and the messaging client 228 operate as an integrated system under the control of the session control server 230. The session control server 230 operates as a multi-tasking event driven state machine as shown in FIG. 6.

A separate state machine 240a14 240c is operated by the session control server 230 for each of the local communication devices 20. During operation of each state machine 240, the session control server 230 receives event signals from each of the voice server 218, the messaging client 228, the session control server 230, the packet switched voice gateway 232, the multimedia communication service provider medium 18, and the particular local communication device 20 for which the state machine 240a, 240b, or 240c is operated. Each state machine 240a14 240c includes multiple processing states 242a14 242c and within each processing state there are a plurality of events 244 that may be detected by the session control server 230. Each event 244 has a processing state dependent processing sequence 246 that is processed by the session control server 230. Some of the processing steps 244 may include transitioning to a new processing state 242. A more detailed discussion of exemplary processing states 242, events 244, and corresponding processing steps 246 is included herein.

Subscriber Data Assistant

Figure 7:
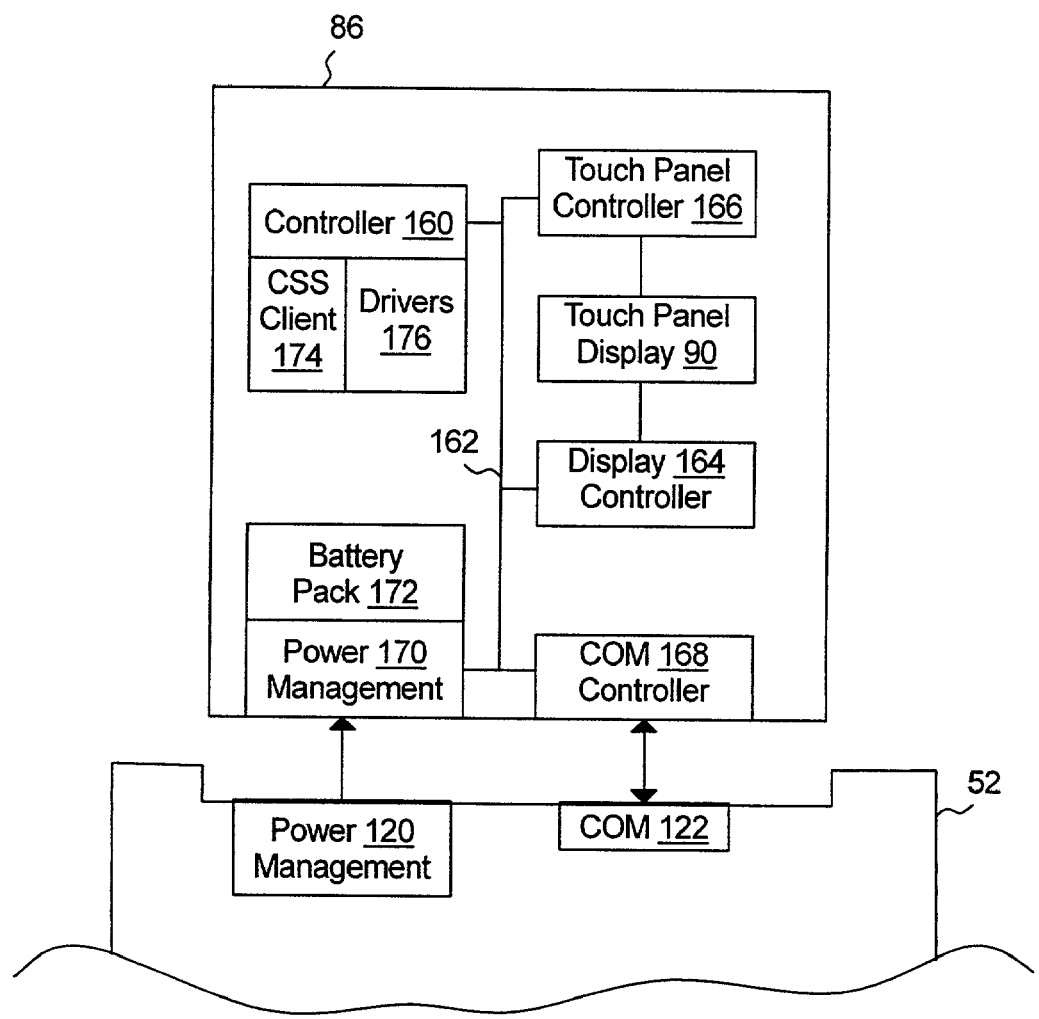
FIG. 7 is a block diagram of a subscriber data assistant in accordance with one embodiment of the present invention.

Turning to FIG. 7, exemplary structure of a subscriber data assistant 86 is shown. The subscriber data assistant 86 includes a controller 160 interconnected to a plurality of peripheral controllers by an internal bus 162. Because of the small size and the portability of the subscriber data assistant 86, the touch panel 90 provides the primary subscriber interface. The touch panel 90 is controlled by a display controller 164 and a touch panel controller 166. The display controller 164 drives the liquid crystal display of touch panel 90 using signals compatible with the resolution and color depth of the display 90. The touch panel controller 166 detects user activation of the touch panel 90. The controller 160 operates appropriate drivers 176 for controlling operation of the touch panel controller 166 and the display controller 164.

A communication controller 168 is also coupled to the bus 162 and operates under control of the application controller 160. In the exemplary embodiment, the communication controller 168 is a serial communication controller that is compatible with the communication controller 122 of the platform unit 52 (both of FIG. 3) such that data communication may occur between the platform unit 52 and the subscriber data assistant 86 when the subscriber data assistant 86 is operatively coupled to the platform unit 52.

A power management circuit 170 selectively receives input power from a battery pack 172 or from the power management circuit 120 in the platform unit 52. The power management circuit 170 includes appropriate circuits for converting the input power voltage to appropriate operating power required by each component of the subscriber data assistant 86. Additionally, the power management circuit 170 includes appropriate circuits for managing charging of the battery pack 172 when subscriber data assistant is coupled to the platform unit 52.

The controller 160 also operates a communication space station client application 174 for displaying multi-media communication management information under control the platform unit 52 when coupled to the platform unit 52. In the exemplary embodiment the communication space station client application 174 receives messages from the platform unit 52 in the form of tagged messages. After receipt of the tagged messages, the communication space station client application 174 builds a display document to display the communication management information represented by tagged content messages in accordance with display layout control messages that are compatible with the size, resolution, and color depth of the touch panel display 90. The display document is then displayed on the touch panel display 90.

It should be appreciated that in additional to operating the drivers 176 and the communication space station client application 174, the controller 160 may optionally operate any of the software applications that are commercially available for portable data assistants (PDAs) which may include address book management software, calendar management software, and games. While operation of such PDA applications may be useful to the subscriber, it is not critical to the operation of the present invention.

Subscriber Wide Area Network Communication Device

Figure 8:
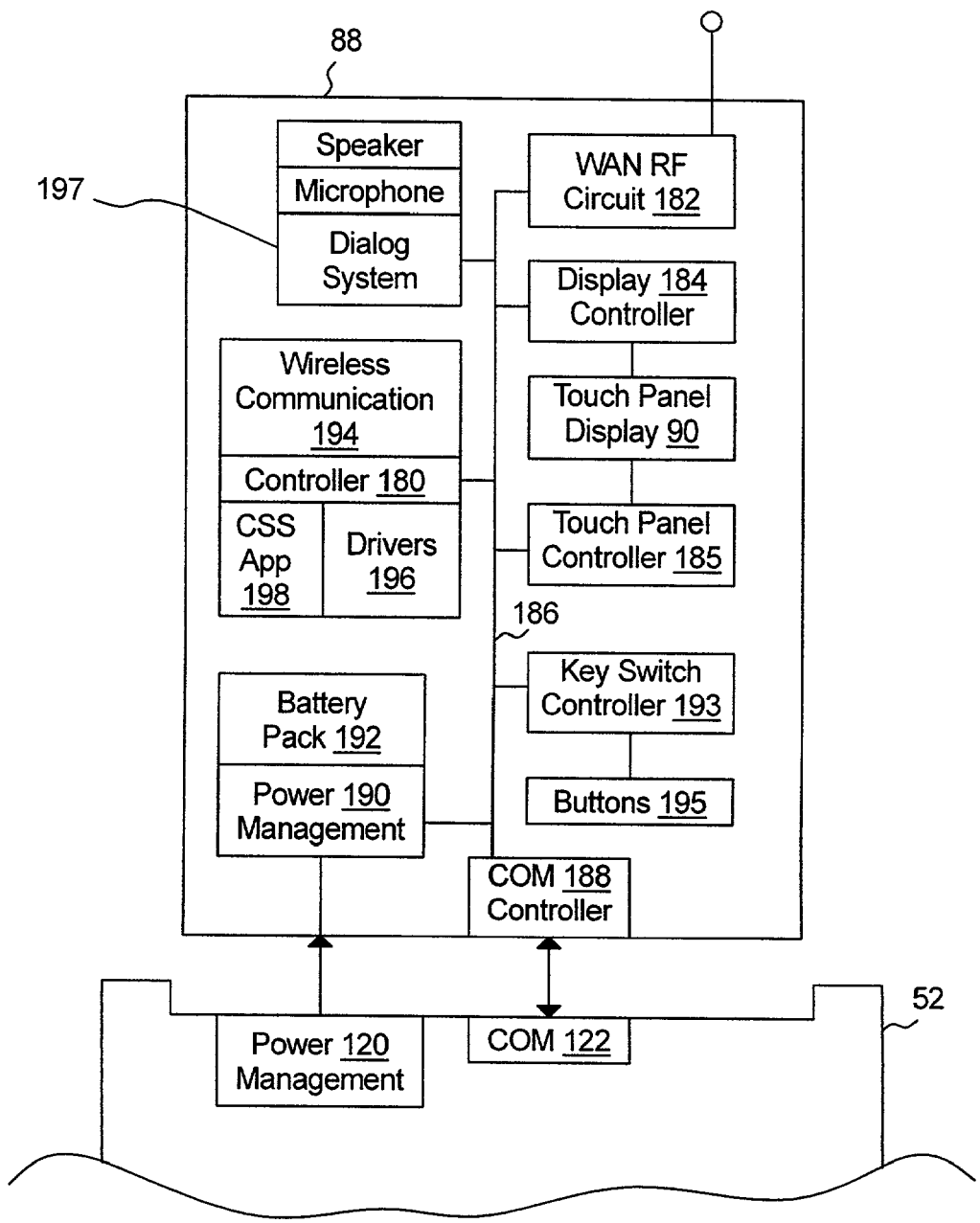
FIG. 8 is a block diagram of a wide area network communication device in accordance with one embodiment of the present invention.

Turning to FIG. 8, exemplary structure of a subscriber wide area network communication device 88 is shown. The wide area network communication device 88 includes a controller 180 interconnected to a plurality of peripheral circuits by an internal bus 186. The peripheral circuits include a wide area network RF circuit 182, a voice system 197, a display controller 184, a key switch controller 193, a communication controller 188, and a power management system 190.

The wide area network RF circuit 182 may be a circuit for transmitting and receiving signals from a wide area network service provider's medium. Exemplary wide area network service provider mediums include an analog or digital cellular or PCS telephone RF system. The controller 180 controls the wide area network RF circuit 182 to effect such communication through a wireless communication application 194.

The key switch controller 193 is coupled to the control buttons 195. The key switch controller 193 operates under control of applicable drivers 196 to drive row and column signals to the control buttons 195 and, upon detecting a short between a row and a column indicating button activation, reports the activation to the controller 180. The control buttons may be used by a subscriber for operating the wide area network communication device 88 when uncoupled form the platform unit 52.

The voice system 197 includes a speaker and a microphone. Under control of the wireless communication application 194, the voice system 197 may provide a subscriber voice interface for an audio session with a remote device over the wide area network service provider's medium.

The display controller 184 operates under control of applicable drivers 146 to drive the display 90 using signals compatible with the resolution and color depth of the display 90. The display 90 may optionally be a touch panel display 90 and the touch panel controller 185, operating under control of applicable drivers 146, detects user activation of the touch panel 90.

The communication controller 188 also operates under control of applicable drivers 196 and may be a serial communication controller compatible with the communication controller 122 in the platform unit 52 such that data communication may occur between the platform unit 52 and the wide area network communication device 88 when the wide area network communication device is operatively coupled to the platform unit 52.

The power management controller 190 operating with a battery pack 192, both of which may operate in a similar manner to the power management controller 170, and the battery pack 172 discussed with reference to FIG. 7.

The controller 180 operates a wide area network communication space station client application 198. When the wide area network communication device 88 is coupled to the platform unit 52, the wide area network communication space station application 198 provides for displaying multi-media communication management information under control the platform unit 52 and provides for multimedia communication directly between the platform unit and the wide area network service provider medium.

The wide area network communication space station client application 198 may receive messages from the platform unit 52 which may be both multi-media communication for communication over the wide area network service provider medium or multi-media communication management information for display on the display 90. Each message comprises a plurality of tagged messages wherein the tag identifies the contents of the message. After receipt of the tagged messages, the wide area network communication space station client application 198 identifies whether the message is for communication with the wide area network service provider medium or whether it is multi-media communication management information for display. If it is multi-media communication management information message for display, the wide area network communication space station client application 198 builds a document to display the communication management information represented by the tagged content messages in accordance with display layout control messages that are compatible with the size, resolution, and color depth of the touch panel display 90. The display document is then displayed on the touch panel display 90. Alternatively, if the message is for communication with the wide area network service provider medium, the controller 180 reformats the message to a format compatible with wide area network service provider medium transmission standards and transmits the message using the wide area network RF circuit 182.

The wide area network communication space station client application may also receive signals from the wide area network service provider medium via the wide area network RF circuit 182. When received, the wide area network communication space station client application 198 reformats the messages into a plurality of tagged messages for communication to the platform unit 52 and sends the tagged messages to the platform unit 52 via the communication controller 188.

Wireless Voice Handsets

Figure 9:
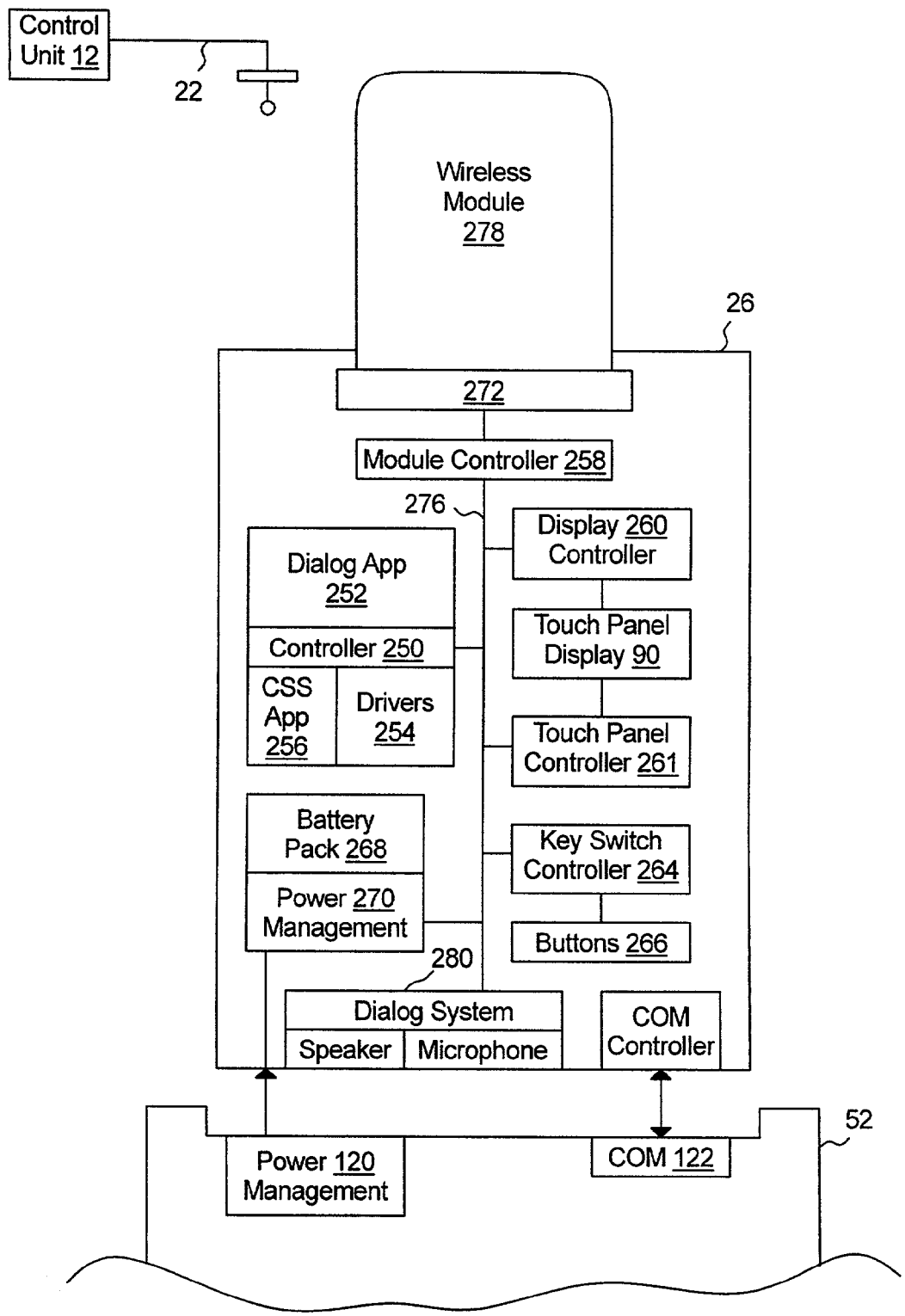
FIG. 9 is a block diagram of a wireless voice handset in accordance with one embodiment of the present invention.

FIG. 9 shows a block diagram of an exemplary wireless voice handset 26. The wireless voice handset 26 includes a network circuit 278 and a controller 250 interconnected by a bus 276 to a plurality of peripheral circuits which include a module controller 258, a display driver 260, a key switch controller 264, and a power management circuit 270. The module controller 258 operatively couples the network circuit 278 to the controller 250 such that the wireless voice handset 26 may communicate with the control unit 12 over the wireless LAN 22 (both of FIG. 1). In the exemplary embodiment, the module controller 258 may be a PCMCIA controller circuit and the network circuit 278 is configured as a PCMCIA card that coupled to the module controller 258 through a PCMCIA connector 272. The controller 250 includes a voice application 252 and appropriate drivers 254 for operating the network circuit 278 and communicating with the control unit 12 using appropriate wireless signaling protocols.

The key switch controller 264 is coupled to the control buttons 266. The key switch controller 264 drives row and column signals to the control buttons 266 and, upon detecting a short between a row and a column indicating button activation, reports the activation to the controller 250. The control buttons may be used by a subscriber for operating the wireless voice handset 26 when uncoupled form the platform unit 52.

The display controller 260 drives the display 90 (optionally a touch panel display 90) using signals compatible with the resolution and color depth of the display 90 under the control of the drivers 254 operated by the controller 250. The optional touch panel controller 261 detects user activation of the touch panel display 90. The power management controller 270 operates in conjunction with a battery pack 268, both of which may operate in a similar manner to the power management controller 170, and the battery pack 172 discussed with reference to FIG. 7.

The controller 250 operates in both two states, the coupled to a communication space station state and an uncoupled state. When in the coupled state, the controller 250 operates a wireless voice handset communication space station client application 256. When the wireless voice handset 26 is coupled to the platform unit 52, the wireless voice handset communication space station application 256 provides for displaying multi-media communication management information under control the platform unit 52. The wireless voice handset communication space station client application 250 may receive multi-media communication management information content messages and control messages from the control unit 12 via the wireless network 22. Each message comprises a plurality of tagged messages wherein the tag identifies the contents of the message. After receipt of the tagged messages, the wireless voice handset communication space station application 250 builds a document to display the communication management information represented by the tagged content messages in accordance with display layout control messages that are compatible with the size, resolution, and color depth of the touch panel display 90. The display document is then displayed on the touch panel display 90.

When operating in the undocked state, the controller operates to interface voice communication between a voice communication system 280 (including a speaker and a microphone) and the control unit 12 via the wireless network 22.

Multi-Media Message Management

FIGS. 10a through 10d represent tables showing exemplary operational states of the multi-tasking event driven state machine 224 of FIG. 6. Referring to the tables of FIGS. 10a through 10d in conjunction with the block diagram of FIG. 5, operation of the session control server 230 for providing exemplary multimedia communication management in accordance with the present invention is shown.

The table of FIG. 10a represents a start up state. In the start up state, the session control server 230 is waiting for an open session request from a new subscriber device 24 on a predetermined port. When a communication space station 24 has just operatively coupled to the local area network 22, obtained a network address from the network address server 220, and is ready to operate as a multi-media communication subscriber station 24, it is programmed to send an open session request to a predetermined network address (matching that of the session control server 230) on the predetermined port. Event 300 represents receipt of an open session request form the subscriber station 24. In response, various steps are performed to initiate management control of multi-media communications of the subscriber station 24 that include: i) establishing a new local communication device state machine 240 (FIG. 6) for supporting the subscriber station 24; ii) providing logon scripts to the subscriber station 24; obtaining an interface configuration of the subscriber station 24; iii) providing main menu display content and main menu layout control messages to the subscriber station 24 that are compatible with the particular display (if any) that is included in the interface configuration of the subscriber station 24; and transitioning to a main menu state as represented by FIG. 10b.

When in the main menu state, the session control server 230 is waiting for one of a plurality of events to occur that may include an event 302 that represents a message indicating subscriber selection of a menu choice from the main menu, event 304 that represents a voice session initiation signal received from another device and indicating the subscriber station 24 as the terminating device, event 306 that represents a voice session initiation message from the subscriber station 24, event 308 that represents a message from the subscriber station 24 indicating that a subscriber device 50 (FIG. 1) has been operatively coupled to, and is ready to be served by, the subscriber station 24, and event 310 that represents a message indicating subscriber activation of a help control.

In response to event 302, the session control server 230 transitions to a state corresponding to the selected menu choice. In response to event 304, or 306, the session control server 230 sends and receives control messages to complete the audio session signaling, set up the appropriate audio session channels through the voice gateway 232 and then transitions to an audio session state wherein audio content messages are relayed for the remainder of the audio session through the voice gateway 232. In response to event 308, the control unit sends messages representing extraction control scripts to the subscriber station 24 that provide for the subscriber station to obtain identification information associated with the subscriber device 50, obtain the identification information, provide main menu display content and main menu layout control messages to the subscriber station 24 that are compatible with the display 90 on the particular subscriber device 50, and transition to a subscriber device main menu state 10c. In response to event 310, the session control server 230 establishes the appropriate audio session channels to the station 24 through the voice gateway 232, and transitions to an audio help state wherein a subscriber is directed through a sequence of help menu choices through audio prompts.

When in the subscriber device main menu state of FIG. 10c, the session control server 230 is waiting for one of the events associate with the subscriber device main menu state that include event 312 that represents a message indicating subscriber selection of a menu choice from the main menu, event 314 that represents a voice session initiation signal received from another device and indicating the subscriber station 24 as the terminating device, event 316 that represents a voice session initiation signal received from another device and indicating the subscriber device 50 that is served by the subscriber station 24 as the terminating device, event 318 that represents a voice session initiation message from the subscriber station 24, event 320 that represents a message indicating subscriber activation of a help control, event 322 that represents a message indicating subscriber activation of the message control, event 324 that represents a message indicating subscriber activation of the audio message control, and event 326 that represents a message indicating that the subscriber device 50 is not longer served by the subscriber station 24.

In response to event 312, the session control server 230 transitions to a state corresponding to the selected menu choice. In response to event 314, 316, or 318 the session control server 230 sends and receives control messages to complete the audio session signaling, set up the appropriate audio session channels through the voice gateway 232 and then transitions to an audio session state wherein audio content messages are relayed for the remainder of the audio session through the voice gateway 232. In response to event 320, the session control server 230 provides messages representing help menu display content and help menu display layout control in accordance with the parameters of the display 90 on the subscriber device 50 and then transitions to a graphic help state wherein the subscriber is directed through a sequence of graphic help menu choices through various levels of display menus provided to the subscriber station 24 through help menu display content messages and help menu display layout control messages. In response to events 322 or 324 the session control server 230 obtains messages associated with the subscriber device from a remote messaging server coupled to the service provider medium, sort the messages in accordance with the message type selection, provide messages representing message list display content and message list display layout control in accordance with the parameters of the display 90 on the subscriber device 50, and then transitions to a message list state (FIG. 10d). In response to event 326 the control unit transitions to the main menu state (FIG. 10b).

When in the message list state of FIG. 10d, the session control server 230 is waiting for one of the events associated with the message list state that include event 328 that represents a voice session initiation signal received from another device and indicating the subscriber station 24 as the terminating device, event 330 that represents a voice session initiation signal received from another device and indicating the subscriber device 50 that is served by the subscriber station 24 as the terminating device, event 332 that represents a voice session initiation message from the subscriber station 24, event 334 that represents a message indicating that the subscriber has activated a control to obtain an audio message, event 336 that represents a message indicating that the subscriber has activated a control to display a message, event 338 representing a message indicating that the subscriber has activated a control to print a message, event 340 that represents a message indicating subscriber activation of a help control, and event 342 that represents a message indicating that the subscriber device 50 is not longer served by the subscriber station 24.

In response to event 328, 330, or 332 the session control server 230 sends and receives control and messages to complete the audio session signaling, sets up the appropriate audio session channels through the voice gateway 232 and then transitions to an audio session state wherein audio content messages are relayed for the remainder of the audio session through the voice gateway 232. In response to event 334 the control unit establishes an appropriate audio session channel to the subscriber station 24 and transitions to the audio session state wherein the voice gateway 232 relays messages representing the audio message content to the subscriber station 24. In response to event 336 the control unit provides messages representing the message display content and the message display layout control that are compatible with parameters of the display 90 on the subscriber device 50 and then transitions to a message display state. In response to event 338, the session control server 230 formats the selected message into a printer compatible file, send the print file to a printer coupled to the network 22, and returns to the message list state. In response to event 340 the session control server 230 provides messages representing help menu display content and help menu display layout control in accordance with the parameters of the display 90 on the subscriber device 50 and then transitions to a graphic help state wherein the subscriber is directed through a sequence of graphic help menu choices through various levels of display menus provided to the subscriber station through help menu display content messages and help menu display layout control messages. The subscriber device 50 then transitions to a message list state (FIG. 10*d*). In response to event 342 the control unit transitions to the main menu state (FIG. 10*b*).

Referring to FIG. 11 in conjunction with the block diagram of FIG. 3, two exemplary states of operation of the subscriber device 24 operating under control of the session control server 230 are shown.

The start up state 346 represents the state of operation of the subscriber station 24 immediately after establishing a network connection (event 366) with the control unit 22 via the network 22. Upon the occurrence of event 366, the subscriber station 24 initiates a session request to the session control server 230 on a predetermined port via the wireless module 94 and the network 22. Event 368 represents confirmation of the session from the session control server 230 and receipt of the logon script from the session control server 230. In response to event 366, the subscriber device processes the script which may include detecting the interface configuration of the subscriber device 24, providing the interface configuration to the session control server 230, and transitioning to the base state 344.

The base state 334 represents the subscriber station 24 waiting for an event signal from one of the peripheral devices which may include event 350 that represents receipt of an audio session signal from the controller 12 over the network 22 via the wireless module 24, event 352 that represents an audio session initiation by the subscriber via the POTS converter circuit 146, the voice system 130, or via the key switch controller 126, event 354 that represents an audio session initiation by the subscriber device 50 via the communication control circuit 122, event 356 that represents a subscriber interface control via the key switch controller 126 or the touch panel controller 128, event 358 that represents receipt of display content and display layout control messages from the controller 12 over the network 22 via the wireless module 94, event 360 that represents receipt of a message comprising a processing script from the controller 12, event 362 that represents a wide area network telephone signal through a wide area network subscriber device 88 (FIG. 1) via the communication controller 122, and event 364 represents detecting a subscriber device 50 being coupled to the subscriber station 24.

In response to event 350, 352, and 354 the subscriber station 24 exchanges audio session signaling control messages with the session control server 230 sends and receives control messages to complete the audio session signaling, sets up the appropriate audio session channels and then transitions to an audio session state wherein audio content messages are relayed for the remainder of the audio session to the voice gateway 232. In response to event 356, the subscriber station provides a message indicating activation of the interface control to the session control server 230. In response to event 358, the subscriber station 24 either updates the display 72 on the touch panel unit 60*b* (both of FIG. 2) via the touch panel controller 128 or provides the messages representing the display content and the display layout control to the subscriber device 50 via the communication controller 122 for the subscriber device 50 to update its own display. In response to event 360, the subscriber device processes the script as provided including interfacing with any of the peripheral devices as required by the script. For example, the extraction control script received from the session control server 230 may require interrogating the subscriber device for identity information and providing a message representing such identification information to the session control server 230. In response to event 362, the subscriber device may enter a wide area network communication state wherein it relays a digital representation of voice signals between the voice system 130 and a wide area network subscriber device 88 such that a voice conversation may take through the wide are network. In response to event 364, the subscriber device 24 may send a message indicating that a subscriber device 50 is being initialized by the subscriber station 24 (which corresponds to event 308 of FIG. 10*b*) and then returns to the base state 344.

It should be appreciated that the systems and methods of the present invention provide for the communication and control of multi-media messages by a central control unit and a plurality of space station communication devices operating under the control of the control unit. This coordinated and integrated system architecture enables the space station communication device to merge the functionality and internal data of various portable subscriber devices into the space station communication device, to direct the functionality and data of the space station communication device to a selected one of the portable subscriber devices, and to provide the subscriber with a simple subscriber interface.

Although the invention has been shown and described with respect to certain preferred embodiments, it is obvious that equivalents and modifications will occur to others skilled in the art upon the reading and understanding of the specification. For example, the above described processing states, events, and processing steps for both the subscriber station 42 and the session control server 230 are exemplary states only for demonstrating operation and are not intended to limit the scope of the present invention. It is envisioned that after reading and understanding the present invention those skilled in the art may envision other processing states, events, and processing steps to further the objectives of the modular multi-media communication management system of the present invention. The present invention includes all such equivalents and modifications, and is limited only by the scope of the following claims.

What is claimed:

1. A multi-media communication management system for providing voice mail service to each of a plurality of subscribers wherein each of the plurality of subscribers is uniquely associated with a portable subscriber device, the multi-media communication management system comprising:
   a plurality of subscriber desk top telephone stations, at least one of which includes a docking bay for coupling to one of the plurality of portable subscriber devices;
   a control unit comprising:
      a network communication circuit coupling the control unit to a communication network for communication with each of said plurality of subscriber desk top telephone stations;
      a voice server for:
         storing an audio message for a subscriber as a digital file associated with identification of the portable subscriber device that is associated with the subscriber, and
      a session control circuit for:
         establishing a communication session with a selected subscriber desk top telephone station through the network communication circuit;
         obtaining, from the selected subscriber desk top telephone station, identification of the one of a plurality of portable subscriber devices coupled to the docking bay of the selected subscriber desk top telephone station;
         obtaining, from the selected subscriber desk top telephone station, an indication that a subscriber has activated a control to obtain an audio message; and
         providing the contents of a digital file associated with the identification of the portable subscriber device to the selected subscriber desk top telephone station for audible playing of content of the digital file by the subscriber desk top telephone station.

2. The multi-media communication management system of claim 1, wherein:
   the control unit further comprises:
      a service provider interface for coupling the control unit to a service provider network for communication with a remote audio endpoint device; and
      the audio message for a subscriber represents a portion of an audio communication session established with the remote audio endpoint device in response to the remote audio endpoint device dialing a telephone number associated with the subscriber and being routed to the control unit by the service provider network.

3. The multi-media communication management system of claim 2, wherein the session control circuit further:
   provides control messages to the selected subscriber desk-top telephone station to effect the display of a list of audio messages that are associated with the portable subscriber device coupled to the docking bay on a display screen; and
   wherein obtaining, from the selected subscriber desktop telephone station, an indication that a subscriber has activated a control to obtain an audio message includes obtaining identification of one or the audio messages included in the list; and
   wherein providing the contents of a digital file associated with the identification of the portable subscriber device comprises providing the contents of the digital file that is associated with the audio message identified from the list.

4. The multi-media communication management system of claim 3, wherein the session control circuit further:
   provides control messages to the selected subscriber desk-top telephone station to obtain, from the subscriber desk top telephone station, voice mail content messages that are stored in the portable subscriber device that is coupled to the docking bay of the subscriber desk top telephone station; and
   stores the voice mail content messages as a digital file associated with identification of the portable subscriber device from which the voice mail content message was obtained.

5. The multi-media communication management system of claim 2, wherein:
   the control unit further comprises:
   a service provider interface for coupling the control unit to a service provider network for communication with a remote messaging system; and
   the voice server stores an audio message for a subscriber by transferring the digital file associated with identification of the portable subscriber device that is associated with the subscriber to the remote messaging system via the service provider interface.

6. The multi-media communication management system of claim 5, wherein the session control circuit further:
   provides control messages to the selected subscriber desk-top telephone station to effect the display of a list of audio messages that are associated with the portable subscriber device coupled to the docking bay on a display screen; and
   wherein obtaining, from the selected subscriber desktop telephone station, an indication that a subscriber has activated a control to obtain an audio message includes obtaining identification of one of the audio messages included in the list; and
   wherein providing the contents of a digital file associated with the identification of the portable subscriber device comprises providing the contents of the digital file that is associated with the audio message identified from the list.

7. The multi-media communication management system of claim 1, wherein the session control circuit further:
   provides control messages to the selected subscriber desk-top telephone station to obtain, from the subscriber desk top telephone station, voice mail content messages that are stored in the portable subscriber device that is coupled to the docking bay of the subscriber desktop telephone station; and
   stores the voice mail content messages as a digital file associated with identification of the portable subscriber device from which the voice mail content message was obtained.

8. A method of operating a multi-media communication management system for providing voice mail service to each of a plurality of subscribers wherein each of the plurality of subscribers is uniquely associated with a portable subscriber device, the method comprising the steps of:
   storing an audio message for a subscriber as a digital file associated with identification of the portable subscriber device that is associated with the subscriber;

establishing a communication session with a selected subscriber desktop telephone station over a network communication link, the subscriber desktop telephone station including a docking bay for coupled to one of the plurality of portable subscriber devices;

obtaining, from the selected subscriber desk top station, identification of the portable subscriber device that is coupled to the docking bay of the selected subscriber desk top telephone station;

obtaining, from the selected subscriber desk top telephone station, an indication that a subscriber has activated a control to obtain an audio message; and providing the contents of a digital file associated with identification of the portable subscriber device to the selected subscriber desktop telephone station via the network communication link for audibly playing content of the digital file by the subscriber desk top telephone station.

9. The method of claim 8, wherein storing an audio message for a subscriber comprises:

establishing an audio communication session with a remote audio endpoint device over a service provider communication medium in response to the remote audio endpoint device dialing a telephone number associated with the subscriber and being routed to the system by the service provider communication medium; and storing a digital file representing a portion of audio content received from the audio endpoint device.

10. The method of claim 9, further comprising:

providing control messages to the selected subscriber desktop telephone station to effect the display of a list of audio messages that are associated with the portable subscriber device coupled to the docking bay on a display screen; and wherein obtaining, from the selected subscriber desk top telephone station, an indication that a subscriber has activated a control to obtain an audio message includes obtaining identification of one of the audio messages included in the list; and wherein providing the contents of a digital file associated with the identification of the portable subscriber device comprises providing the contents of the digital file that is associated with the audio message identified from the list.

11. The method of claim 10, further comprising the steps of:

providing control messages to the selected subscriber desktop telephone station to obtina, from the subscriber desktop telephone station voice mail content messages from the portable subscriber device that is coupled to the docking bay of the subscriber desktop telephone station; and storing the voice mail content messages as a digital file associated with identification of the portable subscriber device from which the voice mail content message was obtained.

12. The method of claim 8, wherein storing an audio message for a subscriber comprises:

transferring the digital file associated with identification of the portable subscriber device that is associated with the subscriber to a remote messaging system via a service provider communication medium; and providing the contents of a digital file associated with identification of the portable subscriber device to the selected subscriber desktop telephone station comprises obtaining the digital file from the remote messaging system via the service provider communication medium.

13. The method of claim 12, further comprising:

providing control messages to the selected subscriber desktop telephone station to effect the display of a list audio messages that are associated with the portable subscriber device coupled to the docking bay on a display screen; and wherein obtaining, from the selected subscriber desktop telephone station, an indication that a subscriber has activated a control to obtain an audio message includes obtaining identification of one of the audio messages included in the list; and wherein providing the contents of a digital file associated with the identification of the portable subscriber device comprises providing the contents of the digital file that is associated with the audio message identified from the list.

14. The method of claim 13, further comprising the steps of:

providing control messages to the selected subscriber desktop telephone station to obtain, from the subscriber desktop telephone station, voice mail content messages from the portable subscriber device that is coupled to the docking bay of the subscriber desktop telephone station; and storing such voice mail content messages as a digital file associated with identification of the portable subscriber device from which the voice mail content message was obtained.

* * * * *